J. M. Brown,

Preparing Hides.

No. 2,727. Reissued Aug. 13, 1867.

Witnesses:

S. A. Piper

Laurit Miller.

Inventor:

James M. Brown by his attorney.

R. Holdy

N. PETERS, PHOTO-LITHOGRAPHER, WASHINGTON, D. C.

UNITED STATES PATENT OFFICE.

JAMES M. BROWN, OF BOSTON, MASSACHUSETTS.

IMPROVED MACHINE FOR CLEANSING AND SOFTENING SHEEP-SKINS.

Specification forming part of Letters Patent No. 66,294, dated July 2, 1867; Reissue No. 2,727, dated August 13, 1867.

*To all whom it may concern:*

Be it known that I, JAMES M. BROWN, of Boston, in the county of Suffolk and State of Massachusetts, have made a new and useful invention having reference to cleansing and softening sheep-skins, as well as to removing burrs or other like matters therefrom; and I do hereby declare such invention to be fully described in the following specification, and represented in the accompanying drawings, which denote the machine or improved fulling-mill employed by me in the treatment of skins.

Figure 2:
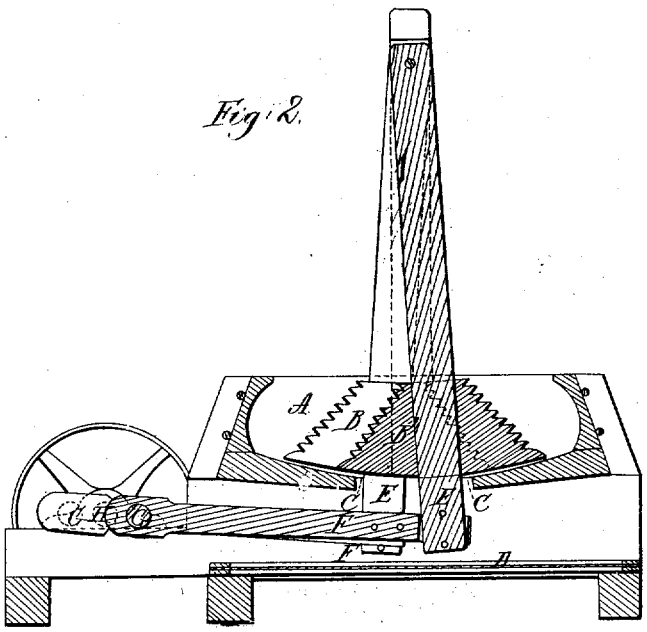
Figure 1:
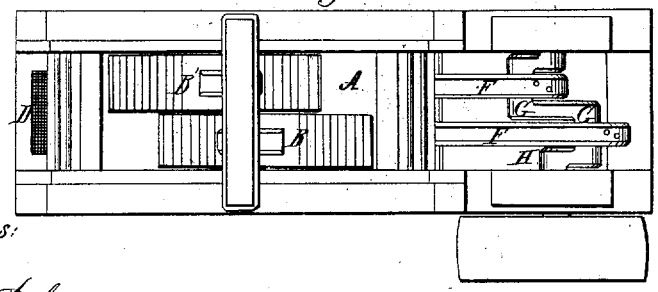

Of such drawings, Figure 1 is a top view, and Fig. 2 a vertical section, of such fulling-mill.

The ordinary process of preparing wool and skins for the market—that is to say, native sheep-skins—may be thus described: First, they are put into a vat of water to soak from twenty-four to forty-eight hours. They are next washed by shaking them back and forth in the water with a long hook, which is a laborious and slow process, and wastes a great amount of the wool, which is torn off by the hook and floats away. Next, the skins are packed upon a frame to drain and soften, which takes from two to six days, according to the weather. Next, they are hung upon tenter-hooks to "sweat," which requires from three to ten days, according to the weather. The "sweating" process opens the pores of the skins and enables the wool to be taken off, with the exception of that near the edges of the skins, which often gets dry, on account of not being sufficiently soft when hung upon the hooks. This wool has to be sheared from these dry edges, which is a waste of time and wool. After the wool may have been taken from the skin, it is dried, and is then ready for the market. These hard and dry edges of the skin not only cause a waste of time and wool, as mentioned, but they are an injury to the skin, because they will not take the lime as well as a sufficiently soft skin will. Therefore they will not make as good stock when tanned. Foreign skins are very hard, dry, and contain more or less burrs. Consequently they need more time to soak and more labor to wash them. To remove the burrs by hard washing is an impossibility. Besides, the skins have to be put through a process called "breaking," which is intended to soften them. This breaking spoils or injures a great many skins by tearing them, especially when they may have large burrs in the wool.

To give an idea of how many skins are spoiled by breaking, I would state that in a lot of sixteen thousand skins that were worked by the above-described means last spring, one thousand were spoiled by the breaking. The foreign skins are worked in the same manner as native skins, with the exception of the breaking, which is done before the washing.

In treating the skins by my process, I put them in the reservoir A of a fulling-mill, whose beaters or stocks are represented at B B′. There is a hole, C, through the bottom of the reservoir, and underneath the said reservoir is a screen, D, or frame covered with woven wire. The beaters have arms E E extending down from them, and being jointed to connecting-rods F F, applied to bell-cranks G G of a shaft, H. When such shaft is revolved, a reciprocating vibratory motion will be imparted to the beaters. After the reservoir or trough of the mill may have been charged with the skins and the beaters set in movement, water should be allowed to run into it upon the skins, and out of it by the hole C, such water falling on and passing through the wire screen D. In a short period of time the skins will be beaten, softened, and cleaned, the waste wool being carried off by the water and left on the screen, from which it may be readily removed.

In regard to the employment of the fulling-mill, I can say that with one-third less soaking of the skins it will wash the wool much better than it can be washed by hand, and will burr the wool at the same time, and will also break and soften the skins, so that there will be a very few, if any dry, parts to be sheared from them after the sweating process may have been concluded. It also saves every particle of wool, and never tears a skin. I would also state that there is a great amount of fine wool which has to be assorted into the coarse grades of wool, on account of its being dirty. This is a very important item, although it may not appear so to one not experienced in the wool business; but I consider it a great advantage to have the wool cleaned, so that every lock can be put in its proper place.

With a fulling-mill that will hold fifty skins, one man can cleanse fifteen hundred skins per day, which, to say the least, would be work enough for ten men by the ordinary mode of operation.

What I claim, therefore, as my invention for the treatment of skins with the wool adhering to them is as follows:

1. The treatment of the skins by means of a fulling-mill and water, substantially as described.

2. The treatment of the skins by a fulling-mill and water, and collecting the waste wool on a screen or its equivalent, as set forth.

3. The combination, as well as the arrangement, of the screen with the fulling-mill, having a discharging-hole in its reservoir, as explained.

JAMES M. BROWN.

Witnesses:
R. H. EDDY,
F. P. HALE, Jr.